US011120109B2

(12) United States Patent
Toth et al.

(10) Patent No.: US 11,120,109 B2
(45) **Date of Patent: *Sep. 14, 2021**

(54) PROCESSING AUTHENTICATION REQUESTS TO SECURED INFORMATION SYSTEMS BASED ON MACHINE-LEARNED EVENT PROFILES

(71) Applicant: Bank of America Corporation, Charlotte, NC (US)

(72) Inventors: Michael E. Toth, Charlotte, NC (US); Hitesh Shah, Seattle, WA (US); Xianhong Zhang, Issaquah, WA (US)

(73) Assignee: Bank of America Corporation, Charlotte, NC (US)

( * ) Notice: Subject to any disclaimer, the term of this patent is extended or adjusted under 35 U.S.C. 154(b) by 10 days.

This patent is subject to a terminal disclaimer.

(21) Appl. No.: 16/210,028

(22) Filed: Dec. 5, 2018

(65) Prior Publication Data

US 2020/0184049 A1 Jun. 11, 2020

(51) Int. Cl.
*H04L 29/06* (2006.01)
*G06F 21/31* (2013.01)
(Continued)

(52) U.S. Cl.
CPC ............ *G06F 21/316* (2013.01); *G06F 21/41* (2013.01); *H04L 63/08* (2013.01);
(Continued)

(58) Field of Classification Search
CPC ... G06F 21/316; G06F 21/41; H04L 63/0892; H04L 63/0861; H04L 63/102; H04L 63/08; H04L 67/306
(Continued)

(56) References Cited

U.S. PATENT DOCUMENTS 7,647,645 B2 1/2010 Edeki et al.
8,079,079 B2 12/2011 Zhang et al.
(Continued)

OTHER PUBLICATIONS

"Baseline Information Security Standard"—University of Colorado Office of Information Security, Sep. 12, 2013 https://www.cu.edu/security/system-wide-baseline-security-standards (Year: 2013).*
(Continued)

*Primary Examiner* — Randy A Scott
(74) *Attorney, Agent, or Firm* — Banner & Witcoff, Ltd.; Michael A. Springs

(57) ABSTRACT

Aspects of the disclosure relate to processing authentication requests to secured information systems based on machine-learned event profiles. A computing platform may receive an authentication request corresponding to a request for a user of a client computing device to access one or more secured information resources associated with a user account in a client portal session. The computing platform may capture one or more behavioral parameters and may generate one or more authentication prompts. Thereafter, the computing platform may receive one or more authentication prompt responses and may evaluate an event pattern. Based on evaluating the event pattern and validating the one or more authentication prompt responses, the computing platform may generate and send one or more authentication commands directing an account portal computing platform to allow access to the one or more secured information resources associated with the user account in the client portal session.

18 Claims, 12 Drawing Sheets

(51) Int. Cl.
*G06F 21/41* (2013.01)
*H04L 29/08* (2006.01)

(52) U.S. Cl.
CPC ...... *H04L 63/0876* (2013.01); *H04L 63/0892* (2013.01); *H04L 63/102* (2013.01); *H04L 67/306* (2013.01); *H04L 63/0861* (2013.01)

(58) Field of Classification Search
USPC .......................................... 726/2, 5, 7, 8, 28
See application file for complete search history.

(56) References Cited

U.S. PATENT DOCUMENTS

| | | | |
|---|---|---|---|
| 8,346,929 | B1 | 1/2013 | Lai |
| 8,627,438 | B1 | 1/2014 | Bhimanaik |
| 9,203,829 | B1 | 12/2015 | Levine et al. |
| 9,396,332 | B2 | 7/2016 | Abrams et al. |
| 9,509,688 | B1 | 11/2016 | Magi Shaashua et al. |
| 9,536,072 | B2 | 1/2017 | Guedalia et al. |
| 9,628,491 | B1 | 4/2017 | Jerrard-Dunne |
| 9,692,740 | B2 | 6/2017 | Hitchcock et al. |
| 10,292,051 | B2 * | 5/2019 | Kusens ............... H04L 63/0861 |
| 10,333,927 | B2 | 6/2019 | Hinton et al. |
| 2006/0064502 | A1 | 3/2006 | Nagarajayya |
| 2006/0218630 | A1 | 9/2006 | Pearson et al. |
| 2007/0208744 | A1 | 9/2007 | Krishnaprasad et al. |
| 2007/0208746 | A1 | 9/2007 | Koide et al. |
| 2007/0220268 | A1 | 9/2007 | Krishnaprasad et al. |
| 2007/0283425 | A1 | 12/2007 | Ture et al. |
| 2007/0289024 | A1 | 12/2007 | Mohammed |
| 2008/0021997 | A1 | 1/2008 | Hinton |
| 2009/0089625 | A1 | 4/2009 | Kannappan et al. |
| 2009/0100136 | A1 | 4/2009 | Jarenskog et al. |
| 2009/0119763 | A1 | 5/2009 | Park et al. |
| 2009/0293108 | A1 | 11/2009 | Weeden |
| 2012/0233665 | A1 | 9/2012 | Ranganathan et al. |
| 2012/0260322 | A1 | 10/2012 | Logan et al. |
| 2012/0323686 | A1 | 12/2012 | Burger et al. |
| 2013/0117831 | A1 | 5/2013 | Hook et al. |
| 2014/0020073 | A1 | 1/2014 | Ronda et al. |
| 2014/0040993 | A1 | 2/2014 | Lorenzo et al. |
| 2014/0101055 | A1 | 4/2014 | Grissom et al. |
| 2014/0337053 | A1 | 11/2014 | Smith |
| 2015/0052587 | A1 | 2/2015 | O'Neill et al. |
| 2015/0256337 | A1 | 9/2015 | Nguyen et al. |
| 2016/0092870 | A1 | 3/2016 | Salama et al. |
| 2016/0094546 | A1 | 3/2016 | Innes et al. |
| 2016/0239649 | A1 | 8/2016 | Zhao |
| 2016/0277481 | A1 | 9/2016 | Yang |
| 2016/0381080 | A1 | 12/2016 | Reddem et al. |
| 2017/0041296 | A1 | 2/2017 | Ford et al. |
| 2017/0048252 | A1 | 2/2017 | Straub et al. |
| 2017/0078225 | A1 | 3/2017 | Pandey et al. |
| 2017/0149770 | A1 | 5/2017 | Hinton et al. |
| 2017/0227995 | A1 | 8/2017 | Lee et al. |
| 2017/0230344 | A1 | 8/2017 | Dhar et al. |
| 2017/0244757 | A1 | 8/2017 | Castinado et al. |
| 2017/0317993 | A1 | 11/2017 | Weber et al. |
| 2017/0331816 | A1 * | 11/2017 | Votaw ..................... G06F 21/34 |
| 2017/0346821 | A1 | 11/2017 | Yedidi et al. |
| 2018/0007553 | A1 | 1/2018 | Dutt et al. |
| 2018/0020009 | A1 | 1/2018 | Wei et al. |
| 2018/0063122 | A1 | 3/2018 | Enoki et al. |
| 2018/0077568 | A1 | 3/2018 | Young et al. |
| 2018/0131685 | A1 | 5/2018 | Sridhar et al. |
| 2018/0139199 | A1 | 5/2018 | Ahuja et al. |
| 2018/0164959 | A1 | 6/2018 | Gupta et al. |
| 2018/0167816 | A1 | 6/2018 | Kusens et al. |
| 2018/0183586 | A1 | 6/2018 | Bhargav-Spantzel et al. |
| 2018/0234464 | A1 * | 8/2018 | Sim ...................... H04L 63/205 |
| 2018/0249285 | A1 | 8/2018 | Shaw et al. |
| 2018/0249292 | A1 | 8/2018 | Skaaksrud |
| 2018/0251132 | A1 | 9/2018 | Phelan |
| 2018/0253682 | A1 | 9/2018 | Gilman et al. |
| 2018/0253713 | A1 | 9/2018 | Ready et al. |
| 2018/0253718 | A1 | 9/2018 | Khan et al. |
| 2018/0253840 | A1 | 9/2018 | Tran |
| 2018/0254101 | A1 | 9/2018 | Gilmore et al. |
| 2018/0255000 | A1 | 9/2018 | Castinado et al. |
| 2018/0255060 | A1 | 9/2018 | Bansal |
| 2018/0255084 | A1 | 9/2018 | Kotinas et al. |
| 2018/0255422 | A1 | 9/2018 | Montemurro et al. |
| 2018/0255456 | A1 | 9/2018 | Yin et al. |
| 2018/0260384 | A1 | 9/2018 | Pasupalak et al. |
| 2018/0260553 | A1 | 9/2018 | Hoyos et al. |
| 2018/0260641 | A1 | 9/2018 | Yadhunandan et al. |
| 2018/0260743 | A1 | 9/2018 | Block et al. |
| 2018/0261060 | A1 | 9/2018 | Siminoff et al. |
| 2018/0261126 | A1 | 9/2018 | Rios et al. |
| 2018/0262388 | A1 | 9/2018 | Johnson et al. |
| 2018/0262529 | A1 | 9/2018 | Allen |
| 2018/0262597 | A1 | 9/2018 | Matthieu et al. |
| 2018/0262620 | A1 | 9/2018 | Wolthuis et al. |
| 2018/0262810 | A1 | 9/2018 | Cronk et al. |
| 2018/0262909 | A1 | 9/2018 | Roller et al. |
| 2018/0264347 | A1 | 9/2018 | Tran et al. |
| 2018/0268015 | A1 | 9/2018 | Sugaberry |
| 2018/0268408 | A1 | 9/2018 | Botros et al. |
| 2018/0268632 | A1 | 9/2018 | Malhotra |
| 2018/0268674 | A1 | 9/2018 | Siminoff |
| 2018/0268691 | A1 | 9/2018 | Meredith et al. |
| 2018/0268818 | A1 | 9/2018 | Schoenmackers et al. |
| 2018/0268944 | A1 | 9/2018 | Prakash |
| 2018/0269554 | A1 | 9/2018 | Sanford |
| 2018/0269927 | A1 | 9/2018 | Gerszberg et al. |
| 2018/0270276 | A9 | 9/2018 | Logue et al. |
| 2018/0270549 | A1 | 9/2018 | Awiszus et al. |
| 2018/0270608 | A1 | 9/2018 | Thoresen et al. |
| 2018/0270612 | A1 | 9/2018 | Thoresen et al. |
| 2018/0274876 | A1 | 9/2018 | Stewart et al. |
| 2018/0275765 | A1 | 9/2018 | Roth et al. |
| 2018/0276041 | A1 | 9/2018 | Bansal et al. |
| 2018/0276205 | A1 | 9/2018 | Auger |
| 2018/0276261 | A1 | 9/2018 | Smart |
| 2018/0276495 | A1 | 9/2018 | Yu et al. |
| 2018/0276710 | A1 | 9/2018 | Tietzen et al. |
| 2018/0278496 | A1 | 9/2018 | Kulshreshtha et al. |
| 2018/0278597 | A1 | 9/2018 | Helms et al. |
| 2018/0278648 | A1 | 9/2018 | Li et al. |
| 2018/0278740 | A1 | 9/2018 | Choi et al. |
| 2018/0301148 | A1 | 10/2018 | Roman et al. |
| 2018/0301149 | A1 | 10/2018 | Roman et al. |
| 2018/0302284 | A1 | 10/2018 | Roman et al. |
| 2018/0302285 | A1 | 10/2018 | Roman et al. |
| 2018/0302362 | A1 | 10/2018 | Abedini et al. |
| 2018/0302363 | A1 | 10/2018 | Abedini et al. |
| 2018/0302418 | A1 | 10/2018 | Scasny |
| 2018/0302420 | A1 | 10/2018 | Nakanelua et al. |
| 2018/0302423 | A1 | 10/2018 | Muddu et al. |
| 2018/0302425 | A1 | 10/2018 | Esman, Sr. et al. |
| 2018/0307303 | A1 | 10/2018 | Powderly et al. |
| 2018/0307399 | A1 | 10/2018 | Sandilya et al. |
| 2018/0307908 | A1 | 10/2018 | O'Brien et al. |
| 2018/0307909 | A1 | 10/2018 | O'Brien et al. |
| 2018/0308073 | A1 | 10/2018 | Kurian et al. |
| 2018/0308100 | A1 | 10/2018 | Haukioja et al. |
| 2018/0308473 | A1 | 10/2018 | Scholar |
| 2018/0309752 | A1 | 10/2018 | Villavicencio et al. |
| 2018/0310159 | A1 | 10/2018 | Katz et al. |
| 2018/0314689 | A1 | 11/2018 | Wang et al. |
| 2018/0315110 | A1 | 11/2018 | Kannan et al. |
| 2018/0315499 | A1 | 11/2018 | Appelbaum et al. |
| 2018/0316852 | A1 | 11/2018 | Graham et al. |
| 2018/0317146 | A1 | 11/2018 | Fitzpatrick |
| 2018/0320967 | A1 | 11/2018 | Kaloudis et al. |
| 2018/0321185 | A1 | 11/2018 | Bantas et al. |
| 2018/0321666 | A1 | 11/2018 | Cella et al. |
| 2018/0321667 | A1 | 11/2018 | Cella et al. |
| 2018/0321672 | A1 | 11/2018 | Cella et al. |
| 2018/0322419 | A1 | 11/2018 | Bugenhagen |
| 2018/0322436 | A1 | 11/2018 | Sotiroudas et al. |
| 2018/0322879 | A1 | 11/2018 | Bhaya et al. |
| 2018/0322961 | A1 | 11/2018 | Kim et al. |
| 2018/0326150 | A1 | 11/2018 | Davis et al. |

(56) References Cited

U.S. PATENT DOCUMENTS

| | | | |
|---|---|---|---|
| 2018/0326291 | A1 | 11/2018 | Tran et al. |
| 2018/0329738 | A1 | 11/2018 | Kasha et al. |
| 2018/0329744 | A1 | 11/2018 | Shear et al. |
| 2018/0330000 | A1 | 11/2018 | Noble et al. |
| 2018/0330059 | A1 | 11/2018 | Bates et al. |
| 2018/0330248 | A1 | 11/2018 | Burhanuddin et al. |
| 2018/0330417 | A1 | 11/2018 | Wollmer et al. |
| 2018/0332132 | A1 | 11/2018 | Sampath et al. |
| 2018/0335776 | A1 | 11/2018 | Theis et al. |
| 2018/0336638 | A1 | 11/2018 | Dziabiak et al. |
| 2018/0336639 | A1 | 11/2018 | Dziabiak et al. |
| 2018/0336640 | A1 | 11/2018 | Dziabiak et al. |
| 2018/0336641 | A1 | 11/2018 | Dziabiak et al. |
| 2018/0336905 | A1 | 11/2018 | Kim et al. |
| 2018/0337966 | A1 | 11/2018 | Pearl et al. |
| 2018/0338120 | A1 | 11/2018 | Lemberger et al. |
| 2018/0338330 | A1 | 11/2018 | Ledvina et al. |
| 2019/0028462 | A1 | 1/2019 | Ishikawa et al. |
| 2019/0057386 | A1 | 2/2019 | Fazeli et al. |
| 2019/0098503 | A1 * | 3/2019 | Dutt .................... H04W 12/065 |
| 2019/0166112 | A1 | 5/2019 | Gordon et al. |
| 2019/0166485 | A1 | 5/2019 | Namiranian |
| 2019/0190704 | A1 | 6/2019 | Srivastava et al. |
| 2019/0220583 | A1 * | 7/2019 | Douglas ................ G06F 21/316 |
| 2019/0245848 | A1 | 8/2019 | Divoux et al. |
| 2019/0332691 | A1 | 10/2019 | Beadles et al. |
| 2019/0372968 | A1 | 12/2019 | Balogh et al. |
| 2019/0392162 | A1 | 12/2019 | Stern et al. |
| 2020/0007530 | A1 | 1/2020 | Mohamad Abdul et al. |
| 2020/0162454 | A1 | 5/2020 | Jain et al. |
| 2020/0184048 | A1 | 6/2020 | Toth et al. |
| 2020/0184049 | A1 | 6/2020 | Toth et al. |
| 2020/0184051 | A1 | 6/2020 | Toth et al. |
| 2020/0184065 | A1 | 6/2020 | Toth et al. |
| 2020/0186518 | A1 | 6/2020 | Shah |
| 2020/0235933 | A1 | 7/2020 | Redkokashin |

OTHER PUBLICATIONS

Dec. 9, 2020 U.S. Notice of Allowance and Fees Due—U.S. Appl. No. 16/210,042.

Dec. 11, 2020 U.S. Non-Final Office Action—U.S. Appl. No. 16/210,010.

Nov. 23, 2020 U.S. Notice of Allowance and Fees Due—U.S. Appl. No. 16/210,092.

Dec. 11, 2020 U.S. Notice of Allowance and Fees Due—U.S. Appl. No. 16/210,062.

Aug. 13, 2020 U.S. Non-Final Office Action—U.S. Appl. No. 16/210,117.

Dec. 15, 2020 U.S. Notice of Allowance and Fees Due—U.S. Appl. No. 16/210,117.

Mar. 10, 2021—U.S. Notice of Allowance—U.S. Appl. No. 16/210,092.

May 4, 2021 U.S. Notice of Allowance and Fees Due—U.S. Appl. No. 16/210,010.

Apr. 29, 2021—U.S. Notice of Allowance—U.S. Appl. No. 16/210,117.

* cited by examiner

PROCESSING AUTHENTICATION REQUESTS TO SECURED INFORMATION SYSTEMS BASED ON MACHINE-LEARNED EVENT PROFILES

BACKGROUND

Aspects of the disclosure relate to providing information security and preventing unauthorized access to resources of an information system. In particular, one or more aspects of the disclosure relate to preventing unauthorized access to information resources by processing authentication requests to secured information systems based on machine-learned event profiles.

As organizations increasingly provide electronic portals via which various users may access, view, and/or modify information, including client information, ensuring the safety and security of information maintained by such organizations and/or made available via such portals is increasingly important. In many instances, however, it may be difficult to ensure the safety and security of such information while also optimizing the efficient and effective technical operations of the computer systems that maintain such information and/or provide such portals.

SUMMARY

Aspects of the disclosure provide effective, efficient, scalable, and convenient technical solutions that address and overcome the technical problems associated with providing information security and preventing unauthorized access to resources of an information system by using machine-learned event profiles in processing authentication requests.

In accordance with one or more embodiments, a computing platform having at least one processor, a communication interface, and memory may receive, via the communication interface, from an account portal computing platform, a first authentication request corresponding to a request for a first user of a first client computing device to access one or more secured information resources associated with a first user account in a first client portal session. Based on receiving the first authentication request from the account portal computing platform, the computing platform may capture one or more behavioral parameters associated with the first client computing device. Subsequently, the computing platform may generate one or more authentication prompts associated with the first authentication request. Thereafter, the computing platform may receive one or more authentication prompt responses corresponding to the one or more authentication prompts associated with the first authentication request. Subsequently, the computing platform may evaluate a first event pattern associated with the first authentication request. Based on evaluating the first event pattern associated with the first authentication request and validating the one or more authentication prompt responses corresponding to the one or more authentication prompts associated with the first authentication request, the computing platform may generate one or more authentication commands directing the account portal computing platform to allow access to the one or more secured information resources associated with the first user account in the first client portal session. Subsequently, the computing platform may send, via the communication interface, to the account portal computing platform, the one or more authentication commands directing the account portal computing platform to allow access to the one or more secured information resources associated with the first user account in the first client portal session.

In some embodiments, capturing the one or more behavioral parameters associated with the first client computing device may include logging order information identifying an order of one or more computing events associated with the first authentication request, timing information identifying a timing of the one or more computing events associated with the first authentication request, and device information identifying a device used in connection with the one or more computing events associated with the first authentication request.

In some embodiments, generating the one or more authentication prompts associated with the first authentication request may include sending at least one authentication prompt to the account portal computing platform. In some embodiments, generating the one or more authentication prompts associated with the first authentication request may include sending at least one authentication prompt to at least one user device registered to the first user account.

In some embodiments, evaluating the first event pattern associated with the first authentication request may include determining that the first event pattern associated with the first authentication request is a closer match to a predetermined valid event pattern than a predetermined malicious event pattern. In some embodiments, the predetermined valid event pattern may be generated by the computing platform based on at least one previous successful login occurrence associated with the first user account. In some embodiments, the predetermined valid event pattern may include valid order data, valid timing data, and valid device data associated with the at least one previous successful login occurrence associated with the first user account. In some embodiments, the predetermined valid event pattern may be generated by the computing platform based on valid population-level authentication data. In some embodiments, the predetermined malicious event pattern may be generated by the computing platform based on malicious population-level authentication data.

In some embodiments, prior to receiving the first authentication request from the account portal computing platform, the computing platform may create a first user account profile corresponding to the first user account. In addition, the computing platform may register one or more user devices as being linked to the first user account.

In some embodiments, prior to receiving the first authentication request from the account portal computing platform, the computing platform may update the first user account profile to include a valid event pattern based on a successful login occurrence associated with the first user account. In some embodiments, prior to receiving the first authentication request from the account portal computing platform, the computing platform may update valid population-level authentication data maintained by the computing platform based on the successful login occurrence associated with the first user account.

In some embodiments, the computing platform may capture activity data associated with the first client portal session. Subsequently, the computing platform may evaluate the captured activity data using baseline activity data. In some instances, based on evaluating the captured activity data using the baseline activity data, the computing platform may continue to allow access to the one or more secured information resources associated with the first user account in the first client portal session. In some instances, based on evaluating the captured activity data using the baseline activity data, the computing platform may halt access to the one or more secured information resources associated with the first user account in the first client portal session.

In some embodiments, the computing platform may update a valid event pattern associated with the first user account based on sending the one or more authentication commands to the account portal computing platform. In some embodiments, the computing platform may update valid population-level authentication data maintained by the computing platform based on sending the one or more authentication commands to the account portal computing platform.

In some embodiments, the computing platform may receive, via the communication interface, from the account portal computing platform, a second authentication request corresponding to a request for a second user of a second client computing device to access one or more secured information resources associated with a second user account in a second client portal session. Based on receiving the second authentication request from the account portal computing platform, the computing platform may capture one or more behavioral parameters associated with the second client computing device. Subsequently, the computing platform may generate one or more authentication prompts associated with the second authentication request. Thereafter, the computing platform may receive one or more authentication prompt responses corresponding to the one or more authentication prompts associated with the second authentication request. Subsequently, the computing platform may evaluate a second event pattern associated with the second authentication request. Based on evaluating the second event pattern associated with the second authentication request and validating the one or more authentication prompt responses corresponding to the one or more authentication prompts associated with the second authentication request, the computing platform may generate one or more authentication commands directing the account portal computing platform to allow access to the one or more secured information resources associated with the second user account in the second client portal session. Subsequently, the computing platform may send, via the communication interface, to the account portal computing platform, the one or more authentication commands directing the account portal computing platform to allow access to the one or more secured information resources associated with the second user account in the second client portal session.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to controlling user authentication based on a sequence of different authentication events. For example, using a machine-learning algorithm, a current or recent authentication event associated with a particular customer or user account may be evaluated, from a risk perspective, in connection with a sequence of other recent authentication events associated with the particular customer or user account. This may enable the machine-learning algorithm to identify potentially malicious authentication requests based on the order, timing, method, and/or other parameters of such requests. In some instances, a filtering component may be used to differentiate suspicious events from non-suspicious events to determine which events should be included in the sequence of authentication events that are evaluated using the machine-learning algorithm. In some instances, a combination of user-specific models and population-level models may be used. In addition, the machine-learning system may continuously train and/or otherwise update models to account for changes in user behavior over time at both a user-specific level and at a population level (e.g., as new authentication capabilities, such as facial recognition are more widely adopted, and/or the like). In some instances, models may utilize other data sources in addition to customer-interaction gathered data, such as internal data (which may, e.g., be input by an internal malicious activity group of the financial institution) and/or industry-level data (which may, e.g., be received from other banks, retailers, and/or the like).

Figure 1A:
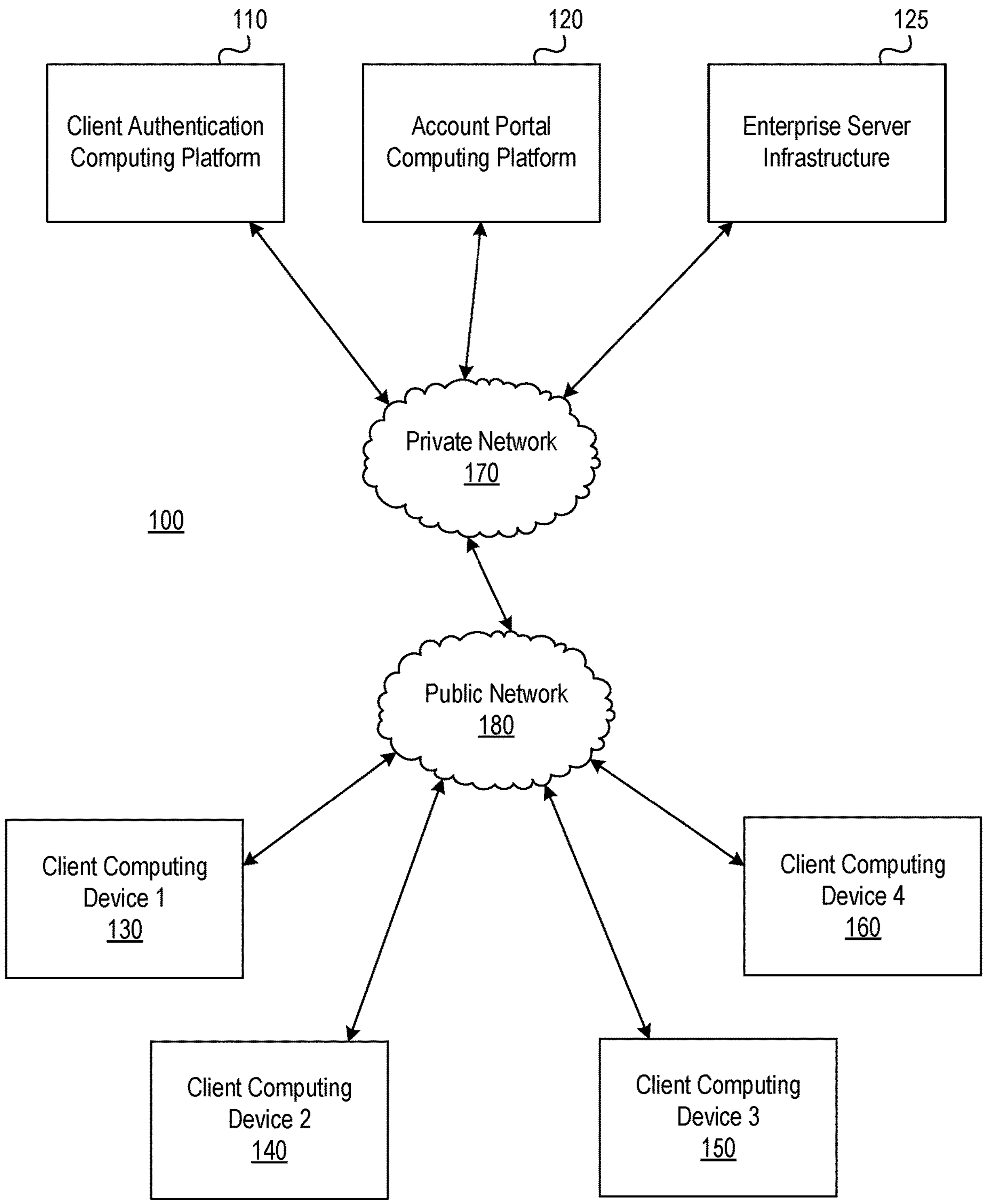
FIGS. 1A and 1B depict an illustrative computing environment for processing authentication requests to secured information systems based on machine-learned event profiles in accordance with one or more example embodiments.
Figure 1B:
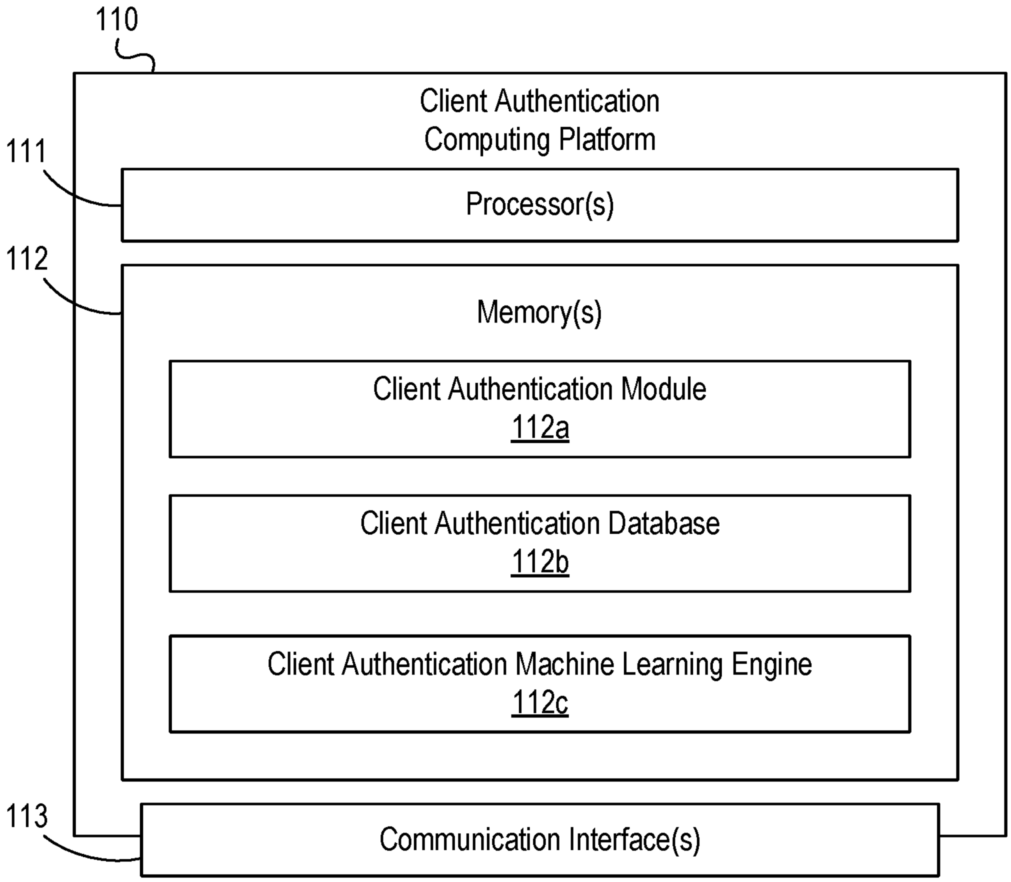

FIGS. 1A and 1B depict an illustrative computing environment for processing authentication requests to secured information systems based on machine-learned event profiles in accordance with one or more example embodiments. Referring to FIG. 1A, computing environment 100 may include one or more computer systems. For example, computing environment 100 may include a client authentication computing platform 110, an account portal computing platform 120, enterprise server infrastructure 125, a first client computing device 130, a second client computing device 140, a third client computing device 150, and a fourth client computing device 160.

As illustrated in greater detail below, client authentication computing platform 110 may include one or more computing devices configured to perform one or more of the functions described herein. For example, client authentication computing platform 110 may include one or more computers (e.g., laptop computers, desktop computers, servers, server blades, or the like).

Account portal computing platform 120 may include one or more computing devices and/or other computer components (e.g., processors, memories, communication interfaces). In addition, and as illustrated in greater detail below, account portal computing platform 120 may be configured to generate, host, transmit, and/or otherwise provide one or more web pages and/or other graphical user interfaces (which may, e.g., cause one or more other computer systems to display and/or otherwise present the one or more web pages and/or other graphical user interfaces). In some instances, the web pages and/or other graphical user interfaces generated by account portal computing platform 120 may be associated with a client portal provided by an organization, such as an online banking portal and/or a mobile banking portal provided by a financial institution. Such a portal may, for instance, provide customers of the financial institution with access to financial account information (e.g., account balance information, account statements, recent transaction history information, or the like) and/or may provide customers of the financial institution with menus, controls, and/or other options to schedule and/or execute various transactions (e.g., online bill pay transactions, person-to-person funds transfer transactions, or the like).

Enterprise server infrastructure 125 may include one or more computing devices and/or other computer components (e.g., processors, memories, communication interfaces). In addition, and as illustrated in greater detail below, enterprise server infrastructure 125 may be configured to provide various enterprise and/or back-office computing functions for an organization, such as a financial institution. For example, enterprise server infrastructure 125 may include various servers and/or databases that store and/or otherwise maintain account information, such as financial account information including account balances, transaction history, account owner information, and/or other information. In addition, enterprise server infrastructure 125 may process and/or otherwise execute transactions on specific accounts based on commands and/or other information received from account portal computing platform 120 and/or other computer systems included in computing environment 100.

Client computing device 130 may be a personal computing device (e.g., desktop computer, laptop computer) or mobile computing device (e.g., smartphone, tablet) that may be linked to and/or used by a first user (e.g., of a client portal provided by account portal computing platform 120). Client computing device 140 may be a personal computing device (e.g., desktop computer, laptop computer) or mobile computing device (e.g., smartphone, tablet) that also may be linked to and/or used by the first user (e.g., of a client portal provided by account portal computing platform 120). Client computing device 150 may be a personal computing device (e.g., desktop computer, laptop computer) or mobile computing device (e.g., smartphone, tablet) that may be linked to and/or used by a second user (e.g., of a client portal provided by account portal computing platform 120) different from the first user. Client computing device 160 may be a personal computing device (e.g., desktop computer, laptop computer) or mobile computing device (e.g., smartphone, tablet) that also may be linked to and/or used by the second user (e.g., of a client portal provided by account portal computing platform 120).

Computing environment 100 also may include one or more networks, which may interconnect one or more of client authentication computing platform 110, account portal computing platform 120, enterprise server infrastructure 125, client computing device 130, client computing device 140, client computing device 150, and client computing device 160. For example, computing environment 100 may include a private network 170 (which may, e.g., interconnect client authentication computing platform 110, account portal computing platform 120, enterprise server infrastructure 125, and/or one or more other systems which may be associated with an organization, such as a financial institution) and public network 180 (which may, e.g., interconnect client computing device 130, client computing device 140, client computing device 150, and client computing device 160 with private network 170 and/or one or more other systems, public networks, sub-networks, and/or the like).

In one or more arrangements, client computing device 130, client computing device 140, client computing device 150, client computing device 160, and/or the other systems included in computing environment 100 may be any type of computing device capable of receiving a user interface, receiving input via the user interface, and communicating the received input to one or more other computing devices. For example, client computing device 130, client computing device 140, client computing device 150, client computing device 160, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of client authentication computing platform 110, account portal computing platform 120, enterprise server infrastructure 125, client computing device 130, client computing device 140, client computing device 150, and client computing device 160 may, in some instances, be special-purpose computing devices configured to perform specific functions.

Referring to FIG. 1B, client authentication computing platform 110 may include one or more processors 111, memory 112, and communication interface 113. A data bus may interconnect processor 111, memory 112, and communication interface 113. Communication interface 113 may be a network interface configured to support communication between client authentication computing platform 110 and one or more networks (e.g., network 170, network 180, or the like). Memory 112 may include one or more program modules having instructions that when executed by processor 111 cause client authentication computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of client authentication computing platform 110 and/or by different computing devices that may form and/or otherwise make up client authentication computing platform 110. For example, memory 112 may have, store, and/or include a client authentication module 112*a*, a client authentication database 112*b*, and a client authentication machine learning engine 112*c*. Client authentication module 112*a* may have instructions that direct and/or cause client authentication computing platform 110 to control access to resources of an information system by processing authentication requests based on machine-learned event profiles, as discussed in greater detail below. Client authentication database 112*b* may store information used by client authentication module 112*a* and/or client authentication computing platform 110 in controlling access to resources of an information system by processing authentication requests based on machine-learned event profiles and/or in performing other functions. Client authentication machine learning engine 112*c* may build and/or refine event profiles based on captured and/or logged behavior data, activity data, user interaction data, and/or other data, as illustrated in greater detail below.

Figure 2A:
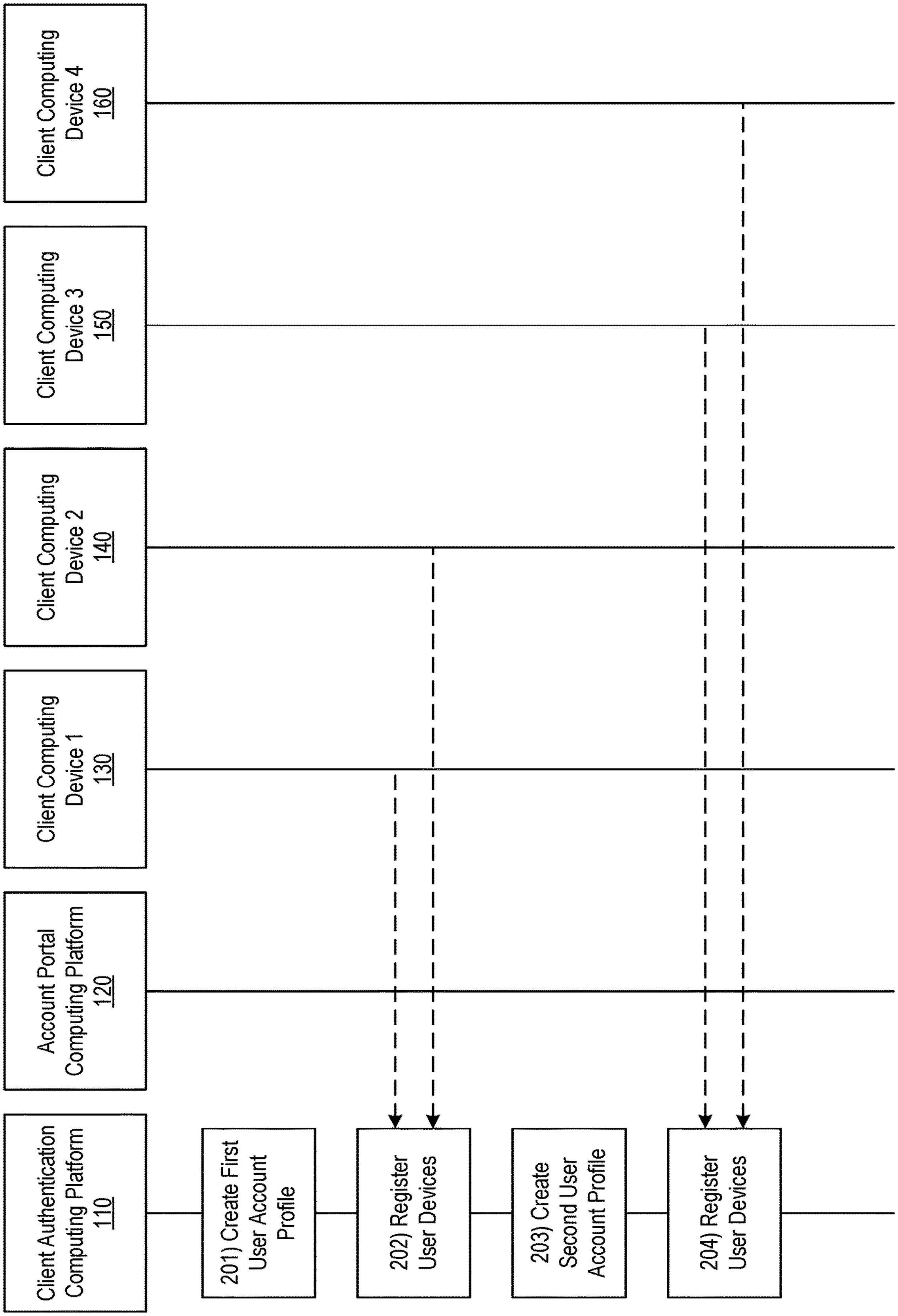
FIGS. 2A-2H depict an illustrative event sequence for processing authentication requests to secured information systems based on machine-learned event profiles in accordance with one or more example embodiments.

FIGS. 2A-2H depict an illustrative event sequence for processing authentication requests to secured information systems based on machine-learned event profiles in accordance with one or more example embodiments. Referring to FIG. 2A, at step 201, client authentication computing platform 110 may create a first user account profile (e.g., by creating and/or storing one or more records in client authentication database 112*b*). For example, at step 201, client authentication computing platform 110 may create a first user account profile corresponding to a first user account. At step 202, client authentication computing platform 110 may register user devices with the first user account. For example, at step 202, client authentication computing platform 110 may register one or more user devices (e.g., client computing device 130, client computing device 140) as being linked to the first user account.

At step 203, client authentication computing platform 110 may create a second user account profile (e.g., by creating and/or storing one or more records in client authentication database 112*b*). For example, at step 203, client authentication computing platform 110 may create a second user account profile corresponding to a second user account. At step 204, client authentication computing platform 110 may register user devices with the second user account. For example, at step 204, client authentication computing platform 110 may register one or more user devices (e.g., client computing device 150, client computing device 160) as being linked to the second user account.

Figure 2B:
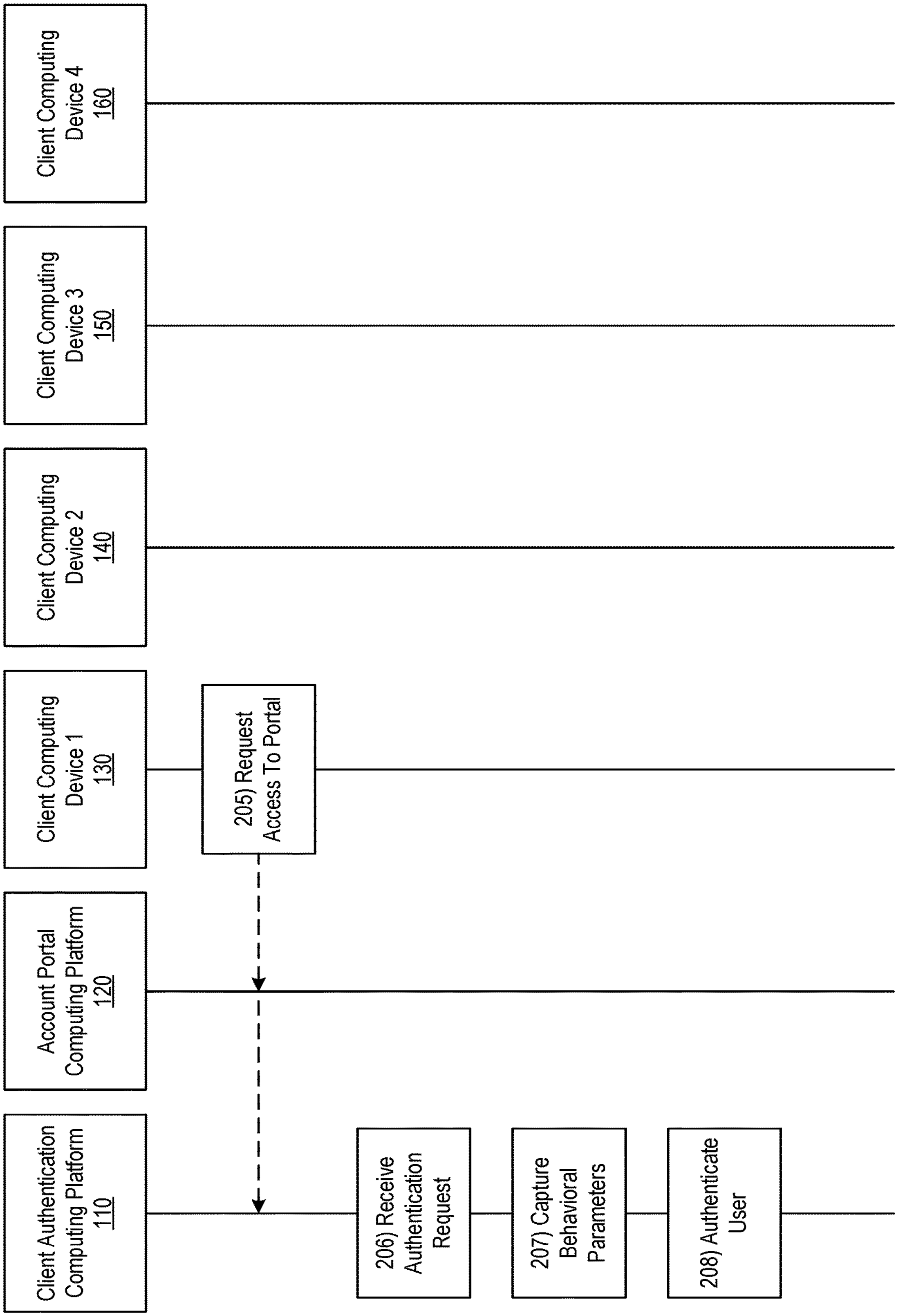

Referring to FIG. 2B, at step 205, client computing device 130 may send a request for portal access to account portal computing platform 120. For example, at step 205, client computing device 130 may request access to a first user account associated with a client account portal provided by account portal computing platform 120. In response to receiving the request, account portal computing platform 120 may generate and/or send an authentication request to client authentication computing platform 110 to authenticate the user of client computing device 130 before providing access to secured information, such as client account information associated with the first user account.

At step 206, client authentication computing platform 110 may receive the authentication request from account portal computing platform 120. At step 207, client authentication computing platform 110 may capture one or more behavioral parameters associated with the authentication request received from account portal computing platform 120 at step 206. For instance, client authentication computing platform 110 may log information identifying an order of events associated with the authentication request received from account portal computing platform 120, information identifying a timing of events associated with the authentication request received from account portal computing platform 120, information identifying a communication method associated with the authentication request received from account portal computing platform 120, information about the device (e.g., client computing device 130) associated with the authentication request received from account portal computing platform 120 (e.g., one or more device identifiers, language settings, and/or other device information), and/or other information. As discussed below, any and/or all of this information may be used by client authentication computing platform 110 in building an event profile (which may, e.g., be used by client authentication computing platform 110 in evaluating future login events associated with the first user account).

At step 208, client authentication computing platform 110 may authenticate the user of client computing device 130. For example, at step 208, client authentication computing platform 110 may validate one or more authentication credentials included in and/or otherwise associated with the authentication request received from account portal computing platform 120, may validate one or more responses to one or more authentication prompts (e.g., one-time passcode prompts, biometric prompts, security question prompts, and/or the like) associated with the authentication request received from account portal computing platform 120, and/or may otherwise determine to grant and/or otherwise allow client computing device 130 to access the first user account based on exchanging information with client computing device 130 and/or one or more other systems and/or devices.

Figure 2C:
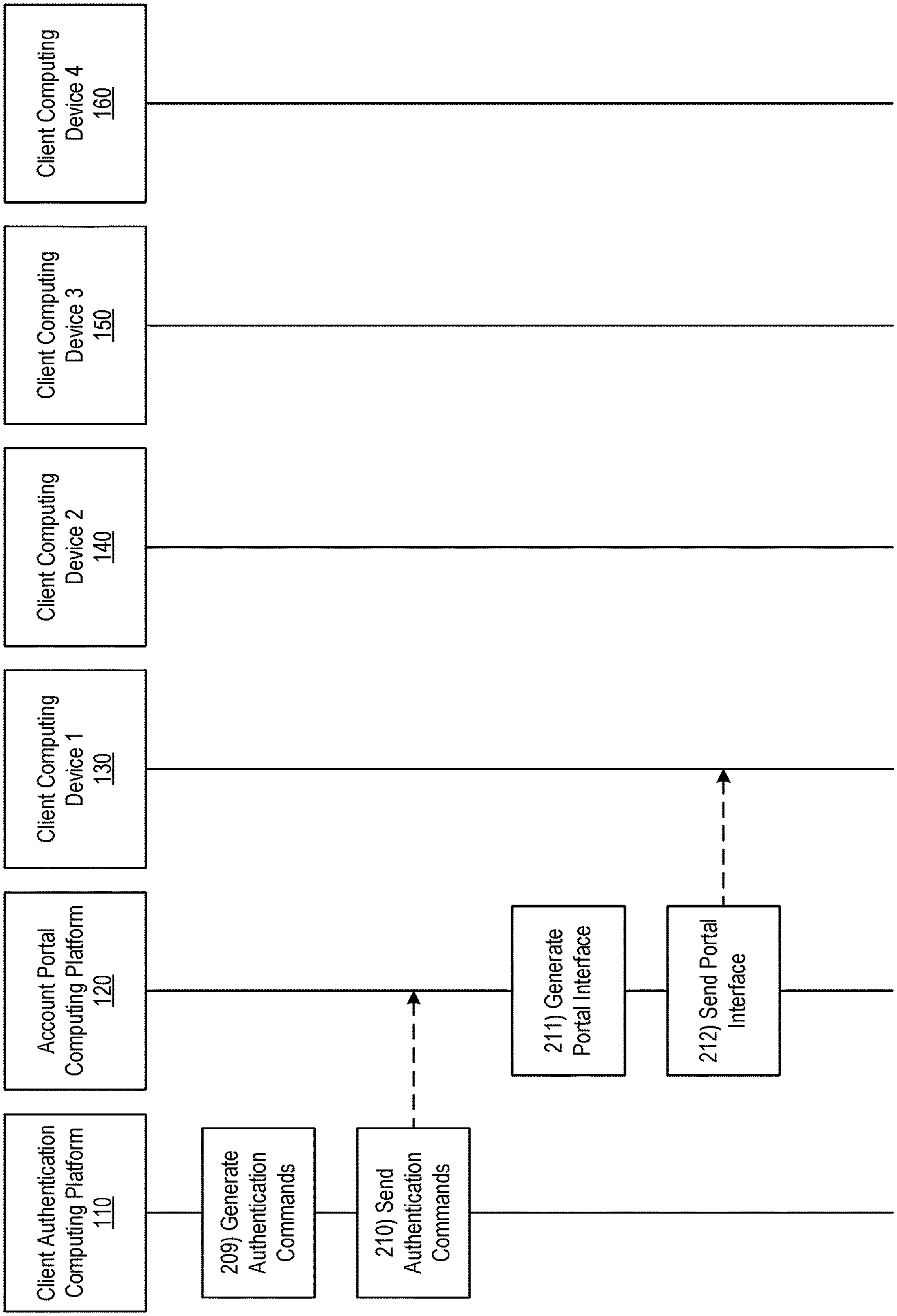

Referring to FIG. 2C, at step 209, client authentication computing platform 110 may generate one or more authentication commands (which may, e.g., direct, control, and/or otherwise cause account portal computing platform 120 to provide client computing device 130 with access the first user account). At step 210, client authentication computing platform 110 may send the one or more authentication commands to account portal computing platform 120. At step 211, account portal computing platform 120 may generate one or more portal user interfaces based on the one or more authentication commands received from client authentication computing platform 110. At step 212, account portal computing platform 120 may send the one or more portal user interfaces to client computing device 130 (which may, e.g., trigger and/or otherwise cause client computing device 130 to display and/or otherwise present the one or more portal user interfaces).

Figure 2D:
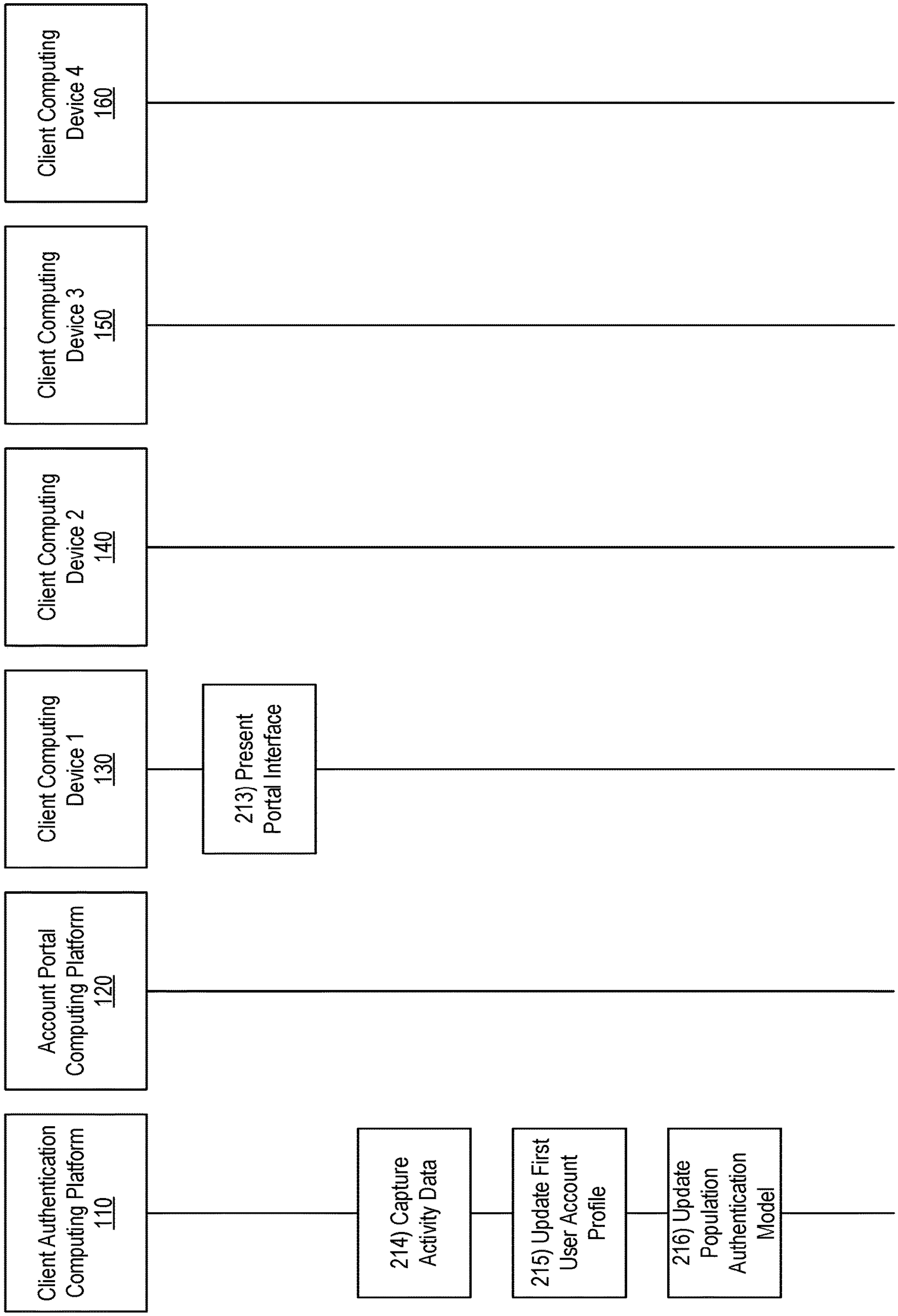
Figure 3:
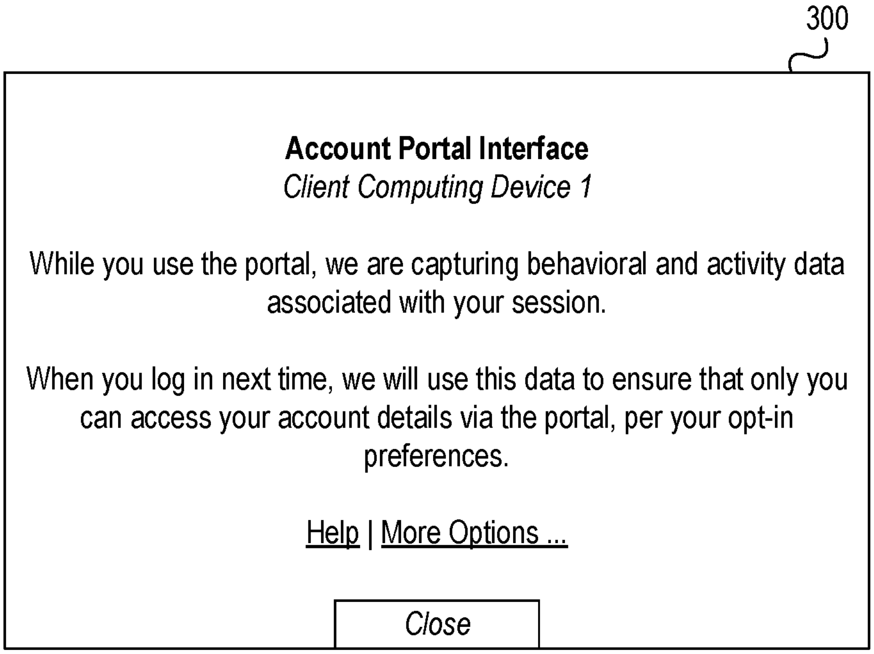
FIGS. 3 and 4 depict example graphical user interfaces for processing authentication requests to secured information systems based on machine-learned event profiles in accordance with one or more example embodiments.

Referring to FIG. 2D, at step 213, client computing device 130 may present the one or more portal user interfaces received from account portal computing platform 120. For example, in presenting the one or more portal user interfaces received from account portal computing platform 120, client computing device 130 may display and/or otherwise present one or more graphical user interfaces similar to graphical user interface 300, which is illustrated in FIG. 3. As seen in FIG. 3, graphical user interface 300 may include information indicating that access to the portal has been granted and/or information associated with the first user account, as well as information about data capture and analysis that may be performed by client authentication computing platform 110 for future authentication purposes (e.g., "While you use the portal, we are capturing behavioral and activity data associated with your session. When you log in next time, we will use this data to ensure that only you can access your account details via the portal, per your opt-in preferences.").

At step 214, client authentication computing platform 110 may capture activity data (which may, e.g., include information identifying various specific parameters of usage of the portal). For instance, client authentication computing platform 110 may capture activity data identifying specific pages, menus, and/or resources accessed by the user of client computing device 130 via the portal, activity data identifying amounts of time that specific pages, menus, and/or resources were accessed by the user of client computing device 130 via the portal, activity data identifying an order in which specific pages, menus, and/or resources were accessed by the user of client computing device 130 via the portal, and/or other activity data.

At step 215, client authentication computing platform 110 may update the first user account profile (e.g., to include the activity data captured at step 214 and/or to include event profile data determined by client authentication computing platform 110 based on the activity data). For example, at step 215, client authentication computing platform 110 may update the first user account profile to include a valid event pattern based on a successful login occurrence associated with the first user account. For instance, the valid event pattern may correspond to a user-specific machine-learned event model (which may, e.g., be generated by client authentication machine learning engine 112*c* and/or client authentication computing platform 110) and may be used in evaluating future authentication events, as discussed in greater detail below. In some instances, client authentication machine learning engine 112*c* and/or client authentication computing platform 110 may filter specific portions of the captured activity data in generating and/or otherwise determining the valid event pattern (e.g., to remove data points associated with portal functions that might only be accessed one time or sporadically, so as to improve the likelihood that the model matches the most common account access use cases for the specific user).

At step 216, client authentication computing platform 110 may update a population-level authentication model (e.g., to include the activity data captured at step 214 and/or to include event profile data determined by client authentication computing platform 110 based on the activity data). For example, at step 216, client authentication computing platform 110 may update valid population-level authentication data maintained by the computing platform (e.g., client authentication computing platform 110) based on the successful login occurrence associated with the first user account. In some instances, in addition to including the activity data captured at step 214 and/or the event profile data determined by client authentication computing platform 110 based on the activity data, the valid population-level authentication data maintained by client authentication computing platform 110 may include and/or be determined based on internal data (which may, e.g., identify specific parameters and/or patterns associated with valid usage and/or malicious usage and which may be provided by and/or obtained from an enterprise organization operating client authentication computing platform 110) and/or industry data (which also may, e.g., identify specific parameters and/or patterns associated with valid usage and/or malicious usage and which may be provided by and/or obtained from one or more other organizations different from the enterprise organization operating client authentication computing platform 110).

Subsequently, client authentication computing platform 110 may process additional authentication events involving the first user account and the same and/or other client devices, along with additional authentication events involving other user accounts. In the example steps described below, client authentication computing platform 110 may process a second authentication event involving the first user account, and client authentication computing platform 110 may evaluate whether the authentication event is legitimate or potentially malicious using the event patterns and/or models described above.

Figure 2E:
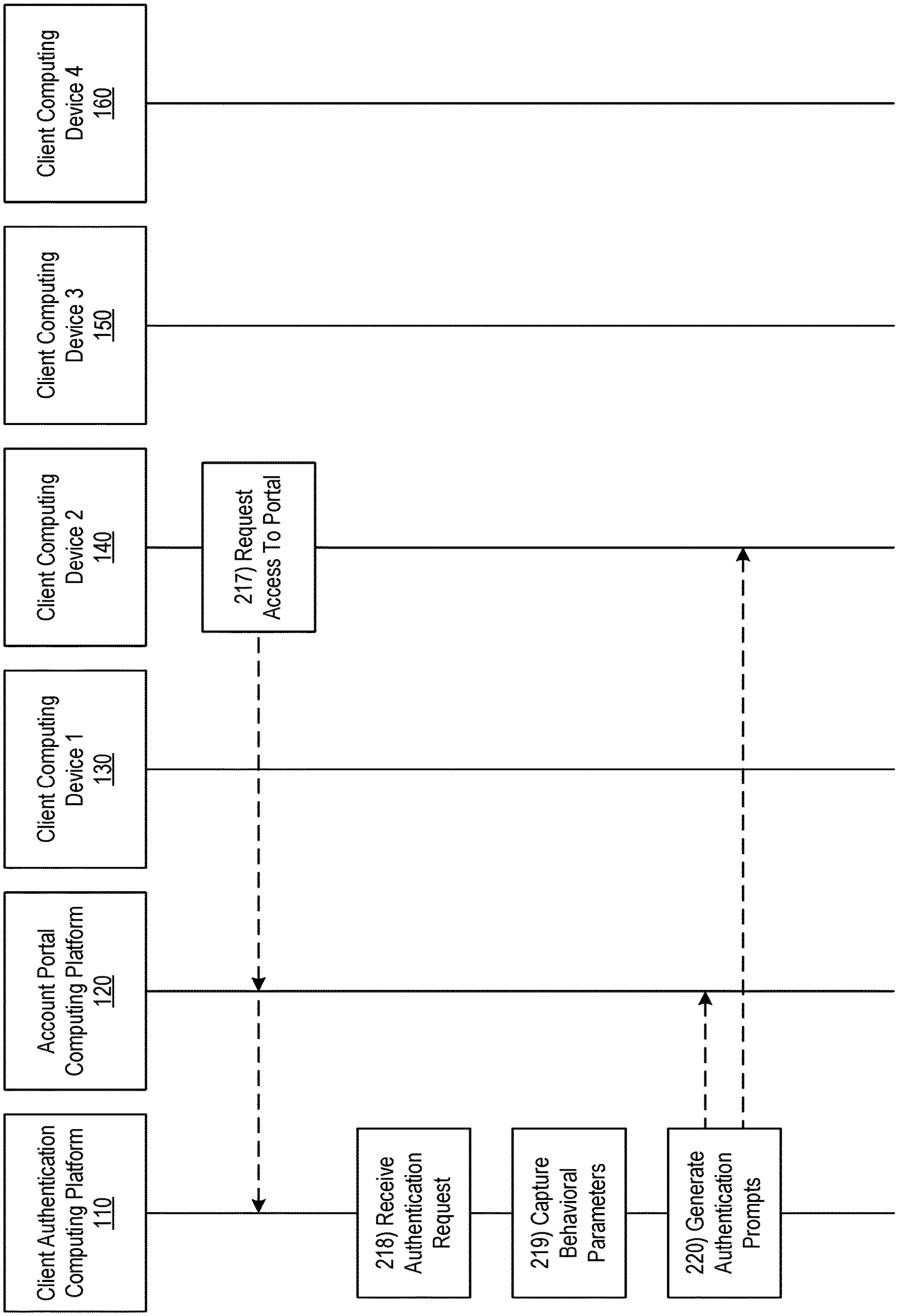

Referring to FIG. 2E, at step 217, client computing device 140 may send a request for portal access to account portal computing platform 120. For example, at step 217, client computing device 140 may request access to the first user account associated with the client account portal provided by account portal computing platform 120. In response to receiving the request, account portal computing platform 120 may generate and/or send an authentication request to client authentication computing platform 110 to authenticate the user of client computing device 140 before providing access to secured information, such as client account information associated with the first user account.

At step 218, client authentication computing platform 110 may receive the authentication request from account portal computing platform 120. For example, at step 218, client authentication computing platform 110 may receive, via the communication interface (e.g., communication interface 113), from an account portal computing platform (e.g., account portal computing platform 120), a first authentication request corresponding to a request for a first user of a first client computing device (e.g., client computing device 140) to access one or more secured information resources associated with a first user account in a first client portal session.

At step 219, client authentication computing platform 110 may capture one or more behavioral parameters associated with the authentication request received from account portal computing platform 120 at step 218. For example, at step 219, based on receiving the first authentication request from the account portal computing platform (e.g., account portal computing platform 120), client authentication computing platform 110 may capture one or more behavioral parameters associated with the first client computing device (e.g., client computing device 140). For instance, client authentication computing platform 110 may log information identifying an order of events associated with the authentication request received from account portal computing platform 120, information identifying a timing of events associated with the authentication request received from account portal computing platform 120, information identifying a communication method associated with the authentication request received from account portal computing platform 120, information about the device (e.g., client computing device 140) associated with the authentication request received from account portal computing platform 120 (e.g., one or more device identifiers, language settings, and/or other device information), and/or other information.

In some embodiments, capturing the one or more behavioral parameters associated with the first client computing device may include logging order information identifying an order of one or more computing events associated with the first authentication request, timing information identifying a timing of the one or more computing events associated with the first authentication request, and device information identifying a device used in connection with the one or more computing events associated with the first authentication request. For example, in capturing the one or more behavioral parameters associated with the first client computing device (e.g., client computing device 140), client authentication computing platform 110 may log order information identifying an order of one or more computing events associated with the first authentication request, timing information identifying a timing of the one or more computing events associated with the first authentication request, and device information identifying a device used in connection with the one or more computing events associated with the first authentication request. For instance, the order information may identify an order in which the user of client computing device 140 selected one or more user interface elements, the timing information may indicate amounts of time that elapsed between such selections made by the user of client computing device 140, and the device information may identify specific parameters of client computing device 140 (e.g., one or more unique device identifiers, device language preferences, device version, operating system, operating system version, and/or the like). As illustrated below, any and/or all of this information may be compared (e.g., by client authentication computing platform 110) against one or more event patterns to evaluate whether the authentication request is likely legitimate or potentially malicious.

At step 220, client authentication computing platform 110 may generate one or more authentication prompts. For example, at step 220, client authentication computing platform 110 may generate one or more authentication prompts associated with the first authentication request. In some embodiments, generating the one or more authentication prompts associated with the first authentication request may include sending at least one authentication prompt to the account portal computing platform. For example, in generating the one or more authentication prompts associated with the first authentication request, client authentication computing platform 110 may send at least one authentication prompt to the account portal computing platform (e.g., account portal computing platform 120), which may, e.g., present the at least one authentication prompt to the device requesting access to the user account. In some embodiments, generating the one or more authentication prompts associated with the first authentication request may include sending at least one authentication prompt to at least one user device registered to the first user account. For example, in generating the one or more authentication prompts associated with the first authentication request, client authentication computing platform 110 may send at least one authentication prompt to at least one user device registered to the first user account. For instance, client authentication computing platform 110 may send one or more one-time passcodes, biometric authentication prompts, and/or the like to client computing device 130, client computing device 140, and/or one or more other devices registered to the first user account to confirm, using a multi-factor authentication method, that the authentication request is valid.

Figure 2F:
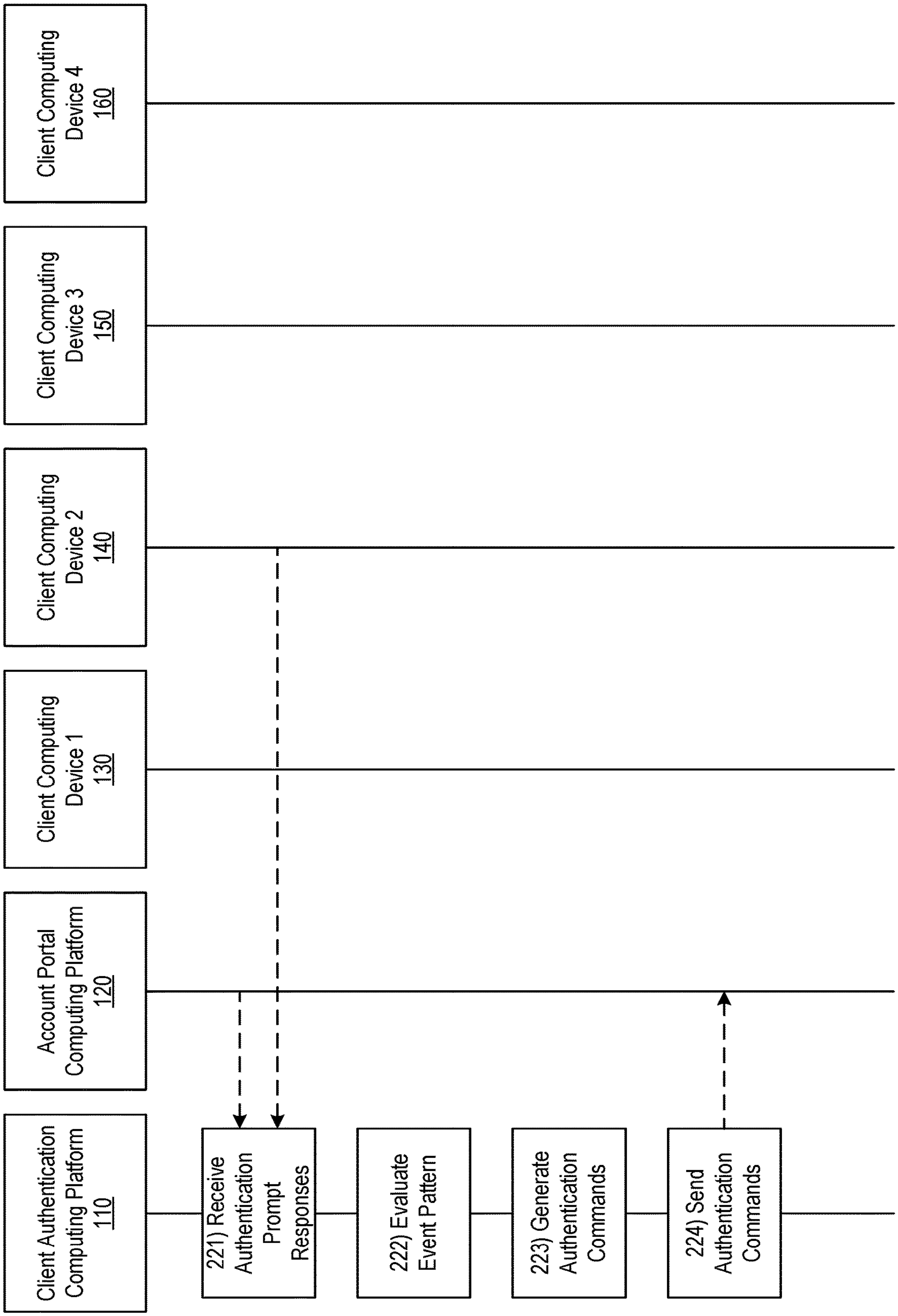

Referring to FIG. 2F, at step 221, client authentication computing platform 110 may receive one or more authentication prompt responses (e.g., from account portal computing platform 120, client computing device 130, client computing device 140, and/or one or more other systems and/or devices). For example, at step 221, client authentication computing platform 110 may receive one or more authentication prompt responses corresponding to the one or more authentication prompts associated with the first authentication request. In addition, client authentication computing platform 110 may validate the one or more authentication prompt responses (e.g., to confirm that correct and/or otherwise valid information was returned, so as to proceed with granting access to the user account). If client authentication computing platform 110 determines that the one or more authentication prompt responses are not valid, client authentication computing platform 110 may generate and/or send one or more error messages to account portal computing platform 120, client computing device 130, client computing device 140, and/or one or more other systems and/or devices. If client authentication computing platform 110 determines that the one or more authentication prompt responses are valid, the event sequence may continue to step 222 as illustrated.

At step 222, client authentication computing platform 110 may evaluate an event pattern associated with the authentication request (e.g., based on the one or more captured behavioral parameters associated with the authentication request). For example, at step 222, client authentication computing platform 110 may evaluate a first event pattern associated with the first authentication request. For instance, the event pattern may define various contours of an event profile that may be used by client authentication computing platform 110 in comparing different authentication events and differentiating between likely legitimate and likely malicious authentication events.

In some embodiments, evaluating the first event pattern associated with the first authentication request may include determining that the first event pattern associated with the first authentication request is a closer match to a predetermined valid event pattern than a predetermined malicious event pattern. For example, in evaluating the first event pattern associated with the first authentication request, client authentication computing platform 110 may determine that the first event pattern associated with the first authentication request is a closer match to a predetermined valid event pattern than a predetermined malicious event pattern. For instance, if the first event pattern associated with the first authentication request is a closer match to a predetermined valid event pattern than a predetermined malicious event pattern, the example event sequence may continue as illustrated, and if the first event pattern associated with the first authentication request is a closer match to a predetermined malicious event pattern than a predetermined valid event pattern, client authentication computing platform 110 may generate and/or send one or more error messages and/or may prevent the requesting user device (e.g., client computing device 140) from accessing the user account. In some instances, client authentication computing platform 110 may calculate and/or otherwise determine the closeness of the match by calculating distance amounts between the captured behavioral parameters associated with the authentication request and corresponding features of one or more valid event patterns and one or more malicious event patterns.

In some embodiments, the predetermined valid event pattern may be generated by the computing platform based on at least one previous successful login occurrence associated with the first user account. For example, the predetermined valid event pattern (which may, e.g., be used by client authentication computing platform 110 at step 222 in evaluating the first event pattern) may be generated by the computing platform (e.g., client authentication computing platform 110) based on at least one previous successful login occurrence associated with the first user account.

In some embodiments, the predetermined valid event pattern may include valid order data, valid timing data, and valid device data associated with the at least one previous successful login occurrence associated with the first user account. For example, the predetermined valid event pattern (which may, e.g., be used by client authentication computing platform 110 at step 222 in evaluating the first event pattern) may include valid order data (e.g., identifying an order in which specific computing operations occurred in connection with a previous login event), valid timing data (e.g., identifying amounts of time that elapsed during which specific computing operations occurred in connection with a previous login event), and valid device data (e.g., identifying one or more parameters of a device used in connection with a previous login event) associated with the at least one previous successful login occurrence associated with the first user account.

In some embodiments, the predetermined valid event pattern may be generated by the computing platform based on valid population-level authentication data. For example, in addition to and/or instead of being generated based on one or more data points in the examples described above, the predetermined valid event pattern (which may, e.g., be used by client authentication computing platform 110 at step 222 in evaluating the first event pattern) may be generated by the computing platform (e.g., client authentication computing platform 110) based on valid population-level authentication data. For instance, client authentication computing platform 110 may generate the predetermined valid event pattern based on valid population-level authentication data that may include and/or be determined based on authentication event information associated with a plurality of other users linked to other user accounts (e.g., different from the first user account) maintained by client authentication computing platform 110 and/or account portal computing platform 120.

In some embodiments, the predetermined malicious event pattern may be generated by the computing platform based on malicious population-level authentication data. For example, the predetermined malicious event pattern (which may, e.g., be used by client authentication computing platform 110 at step 222 in evaluating the first event pattern) may be generated by the computing platform (e.g., client authentication computing platform 110) based on malicious population-level authentication data. For instance, client authentication computing platform 110 may generate the predetermined malicious event pattern based on authentication data that may include and/or be determined based on authentication event information associated with a plurality of identified malicious attempts and/or events involving the same user account and/or other user accounts. In some instances, client authentication computing platform 110 may additionally or alternatively generate the predetermined malicious event pattern based on industry data obtained from external sources.

At step 223, client authentication computing platform 110 may generate one or more authentication commands (e.g., based on determining that the event pattern more closely matches the valid pattern than the malicious pattern). For example, at step 223, based on evaluating the first event pattern associated with the first authentication request and validating the one or more authentication prompt responses corresponding to the one or more authentication prompts associated with the first authentication request, client authentication computing platform 110 may generate one or more authentication commands directing the account portal computing platform (e.g., account portal computing platform 120) to allow access to the one or more secured information resources associated with the first user account in the first client portal session. Alternatively, if client authentication computing platform 110 determines that the event pattern more closely matches the malicious pattern than the valid pattern, client authentication computing platform 110 may generate and/or send one or more error messages.

At step 224, client authentication computing platform 110 may send the one or more authentication commands to account portal computing platform 120. For example, at step 224, client authentication computing platform 110 may send, via the communication interface (e.g., communication interface 113), to the account portal computing platform (e.g., account portal computing platform 120), the one or more authentication commands directing the account portal computing platform (e.g., account portal computing platform 120) to allow access to the one or more secured information resources associated with the first user account in the first client portal session.

Figure 2G:
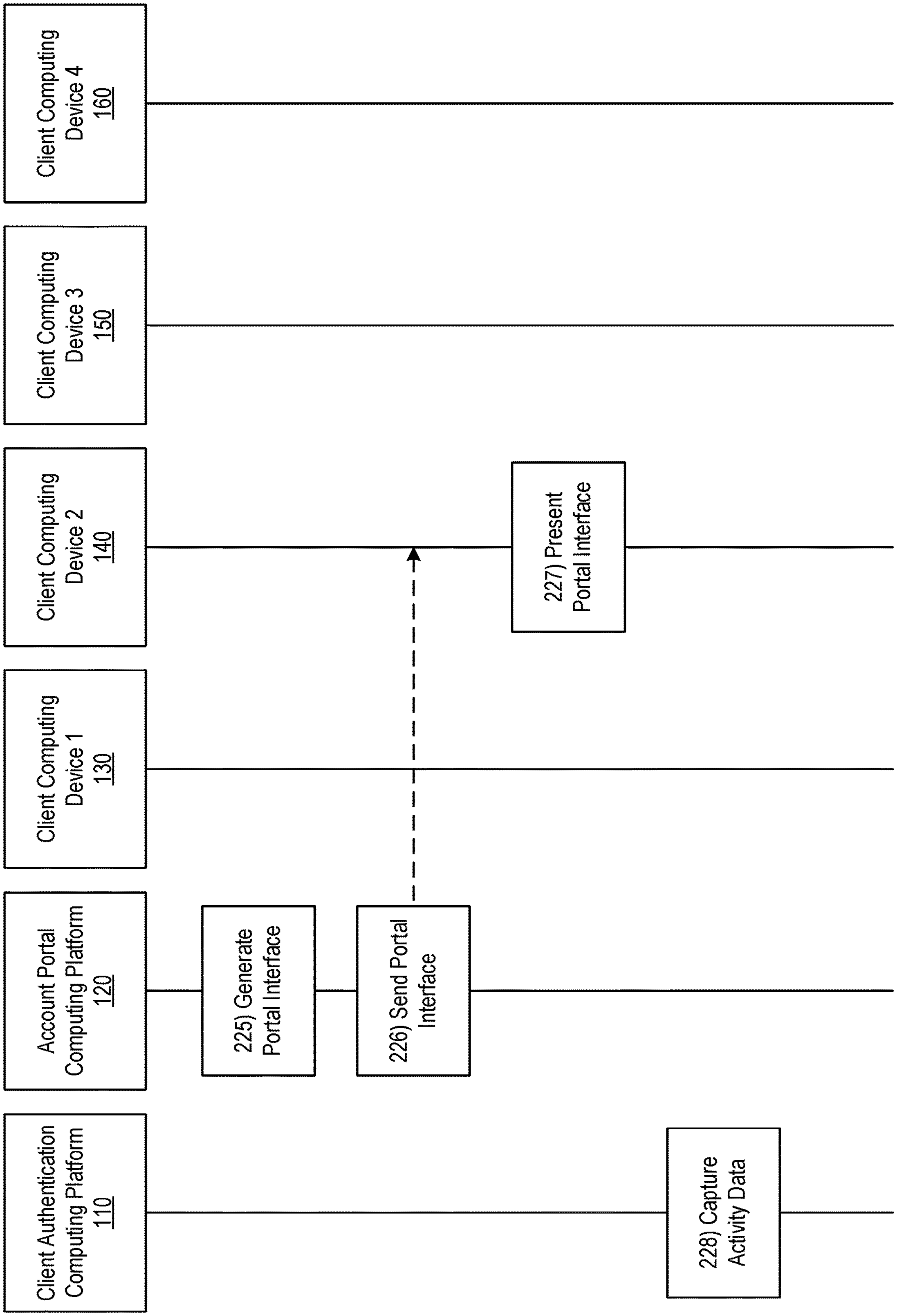
Figure 4:
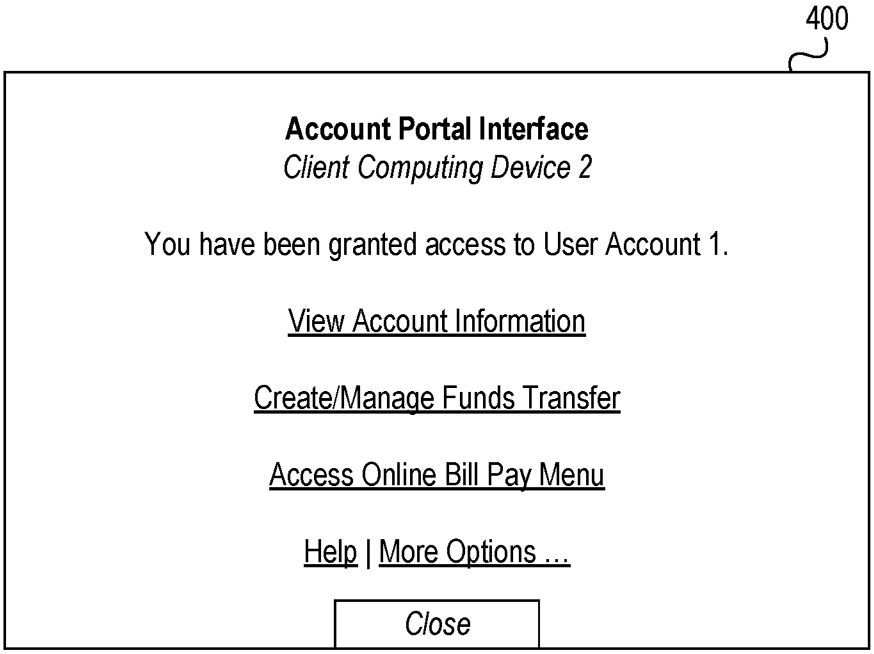

Referring to FIG. 2G, at step 225, account portal computing platform 120 may generate one or more portal user interfaces (e.g., based on the authentication commands received from client authentication computing platform 110). At step 226, account portal computing platform 120 may send the one or more portal user interfaces to client computing device 140. At step 227, client computing device 140 may display and/or otherwise present the one or more portal user interfaces received from account portal computing platform 120. For example, in displaying and/or otherwise presenting the one or more portal user interfaces received from account portal computing platform 120, client computing device 140 may display and/or otherwise present one or more graphical user interfaces similar to graphical user interface 400, which is shown in FIG. 4. As seen in FIG. 4, graphical user interface 400 may be presented (e.g., by client computing device 140) when client authentication computing platform 110 has determined to allow access to the first user account and thus may include one or more user-selectable controls and/or menus allowing a user (e.g., the user of client computing device 140) to create, view, and/or modify user account information.

At step 228, client authentication computing platform 110 may capture activity data (e.g., associated with usage of the portal user interfaces being provided to client computing device 140 by account portal computing platform 120). For example, at step 228, client authentication computing platform 110 may capture activity data associated with the first client portal session. For instance, client authentication computing platform 110 may capture such activity data similar to how client authentication computing platform 110 may capture activity data in the examples steps described above.

Figure 2H:
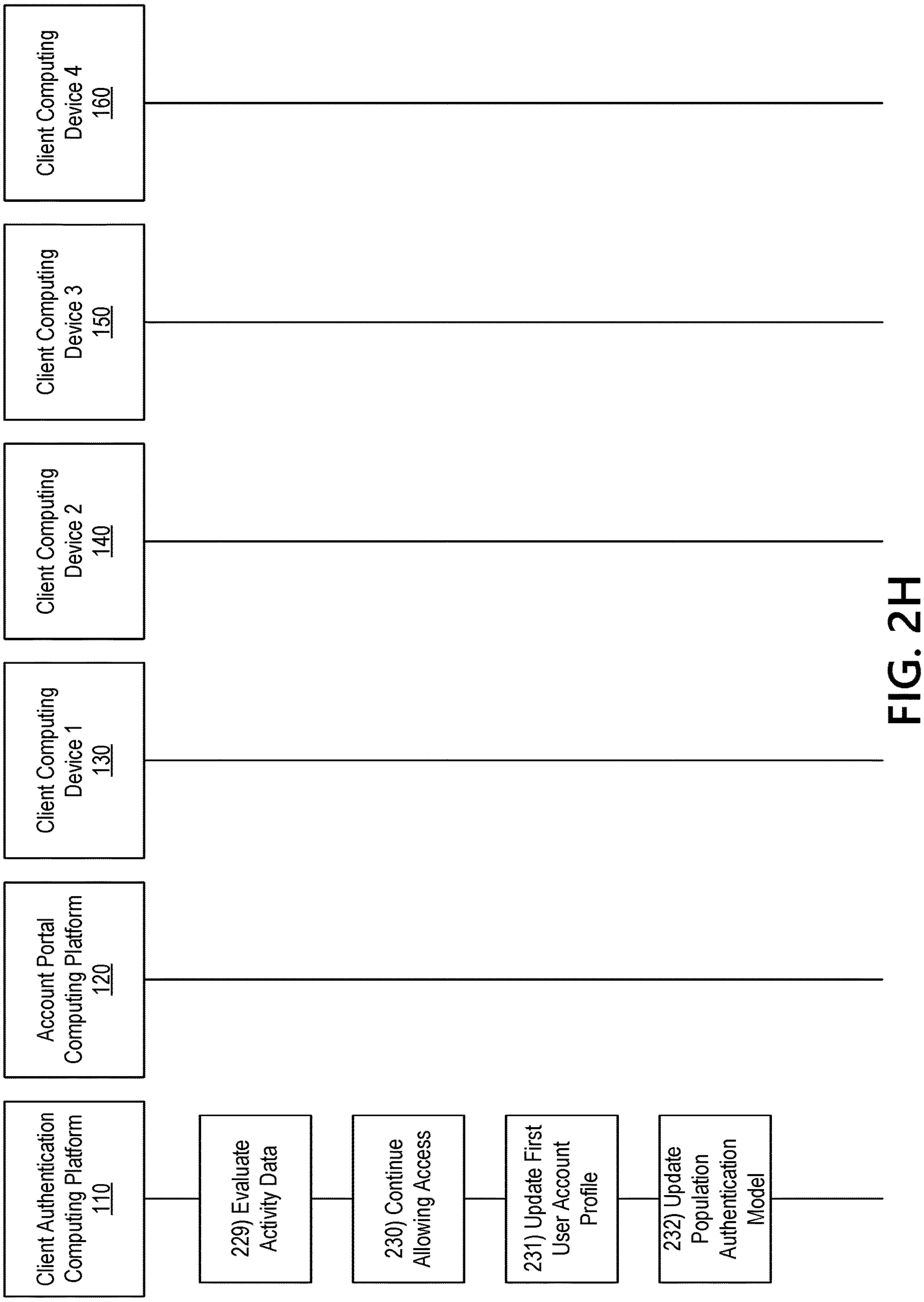

Referring to FIG. 2H, at step 229, client authentication computing platform 110 may evaluate the captured activity data. For example, at step 229, client authentication computing platform 110 may evaluate the captured activity data using baseline activity data (which may, e.g., include and/or be determined by client authentication computing platform 110 based on the activity data captured in earlier authentication events, as such prior activity data may be used as a baseline for valid account activity). In addition, and as illustrated below, this evaluation may be used by client authentication computing platform 110 in determining whether to continue providing client computing device 140 with access to the user account or whether to terminate access (e.g., if the activity is unusual, in which case client authentication computing platform 110 may generate and send commands to account portal computing platform 120 to halt the session and/or terminate the connection).

At step 230, client authentication computing platform 110 may continue allowing access to the user account (e.g., based on determining that the captured activity data is valid; in addition, client authentication computing platform 110 may continue monitoring and/or evaluating activity). For example, at step 230, based on evaluating the captured activity data using the baseline activity data, client authentication computing platform 110 may continue to allow access to the one or more secured information resources associated with the first user account in the first client portal session. Alternatively, if client authentication computing platform 110 determines that the captured activity data is invalid, client authentication computing platform 110 may halt the session and/or terminate the session. For example, based on evaluating the captured activity data using the baseline activity data, client authentication computing platform 110 may halt access to the one or more secured information resources associated with the first user account in the first client portal session.

At step 231, client authentication computing platform 110 may update the first user account profile (e.g., in view of the session and/or activity in the prior steps described above). For example, at step 231, client authentication computing platform 110 may update a valid event pattern associated with the first user account based on sending the one or more authentication commands to the account portal computing platform (e.g., account portal computing platform 120). For instance, client authentication computing platform 110 may update the valid event pattern stored in the user profile.

At step 232, client authentication computing platform 110 may update the population-level authentication model (e.g., in view of the session and/or activity in the prior steps described above). For example, at step 232, client authentication computing platform 110 may update valid population-level authentication data maintained by the computing platform (e.g., client authentication computing platform 110) based on sending the one or more authentication commands to the account portal computing platform (e.g., account portal computing platform 120).

Subsequently, client authentication computing platform 110 may similarly process one or more authentication events from the same and/or other devices involving the same and/or other user accounts by performing one or more actions similar to those described above. For example, client authentication computing platform 110 may receive, via the communication interface (e.g., communication interface 113), from the account portal computing platform (e.g., account portal computing platform 120), a second authentication request corresponding to a request for a second user of a second client computing device (e.g., client computing device 150) to access one or more secured information resources associated with a second user account in a second client portal session. Based on receiving the second authentication request from the account portal computing platform (e.g., account portal computing platform 120), client authentication computing platform 110 may capture one or more behavioral parameters associated with the second client computing device (e.g., client computing device 150). Subsequently, client authentication computing platform 110 may generate one or more authentication prompts associated with the second authentication request. Thereafter, client authentication computing platform 110 may receive one or more authentication prompt responses corresponding to the one or more authentication prompts associated with the second authentication request. Then, client authentication computing platform 110 may evaluate a second event pattern associated with the second authentication request. Based on evaluating the second event pattern associated with the second authentication request and validating the one or more authentication prompt responses corresponding to the one or more authentication prompts associated with the second authentication request, client authentication computing platform 110 may generate one or more authentication commands directing the account portal computing platform (e.g., account portal computing platform 120) to allow access to the one or more secured information resources associated with the second user account in the second client portal session. Subsequently, client authentication computing platform 110 may send, via the communication interface (e.g., communication interface 113), to the account portal computing platform (e.g., account portal computing platform 120), the one or more authentication commands directing the account portal computing platform (e.g., account portal computing platform 120) to allow access to the one or more secured information resources associated with the second user account in the second client portal session.

Figure 5:
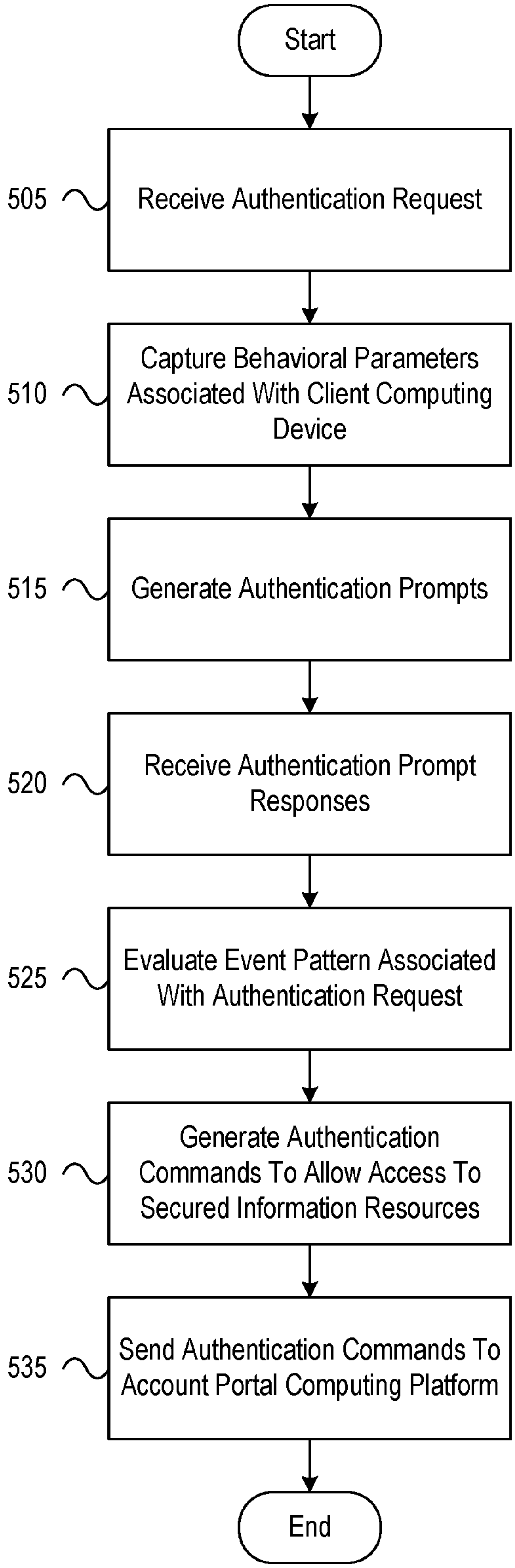
FIG. 5 depicts an illustrative method for processing authentication requests to secured information systems based on machine-learned event profiles in accordance with one or more example embodiments.

FIG. 5 depicts an illustrative method for processing authentication requests to secured information systems based on machine-learned event profiles in accordance with one or more example embodiments. Referring to FIG. 5, at step 505, a computing platform having at least one processor, a communication interface, and memory may receive, via the communication interface, from an account portal computing platform, a first authentication request corresponding to a request for a first user of a first client computing device to access one or more secured information resources associated with a first user account in a first client portal session. At step 510, based on receiving the first authentication request from the account portal computing platform, the computing platform may capture one or more behavioral parameters associated with the first client computing device. At step 515, the computing platform may generate one or more authentication prompts associated with the first authentication request. At step 520, the computing platform may receive one or more authentication prompt responses corresponding to the one or more authentication prompts associated with the first authentication request. At step 525, the computing platform may evaluate a first event pattern associated with the first authentication request. At step 530, based on evaluating the first event pattern associated with the first authentication request and validating the one or more authentication prompt responses corresponding to the one or more authentication prompts associated with the first authentication request, the computing platform may generate one or more authentication commands directing the account portal computing platform to allow access to the one or more secured information resources associated with the first user account in the first client portal session. At step 535, the computing platform may send, via the communication interface, to the account portal computing platform, the one or more authentication commands directing the account portal computing platform to allow access to the one or more secured information resources associated with the first user account in the first client portal session.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
- at least one hardware processor;
- a communication interface communicatively coupled to the at least one hardware processor; and
- non-transitory memory storing computer-readable instructions that, when executed by the at least one hardware processor, cause the computing platform to:
  - receive, via the communication interface, from an account portal computing platform, a first authentication request corresponding to a request for a first user of a first client computing device to access one or more secured information resources associated with a first user account in a first client portal session;
  - based on receiving the first authentication request from the account portal computing platform, capture one or more behavioral parameters associated with the first client computing device;
  - generate one or more authentication prompts associated with the first authentication request;
  - receive one or more authentication prompt responses corresponding to the one or more authentication prompts associated with the first authentication request;
  - evaluate a first event pattern associated with the first authentication request;
  - based on evaluating the first event pattern associated with the first authentication request and validating the one or more authentication prompt responses corresponding to the one or more authentication prompts associated with the first authentication request, generate one or more authentication commands directing the account portal computing platform to allow access to the one or more secured information resources associated with the first user account in the first client portal session;
  - send, via the communication interface, to the account portal computing platform, the one or more authentication commands directing the account portal computing platform to allow access to the one or more secured information resources associated with the first user account in the first client portal session;
  - update a valid event pattern associated with the first user account upon sending the one or more authentication commands to the account portal computing platform; and
  - update valid population-level authentication data maintained by the computing platform upon sending the one or more authentication commands to the account portal computing platform.

2. The computing platform of claim 1, wherein capturing the one or more behavioral parameters associated with the first client computing device comprises logging order information identifying an order of one or more computing events associated with the first authentication request, timing information identifying a timing of the one or more computing events associated with the first authentication request, and device information identifying a device used in connection with the one or more computing events associated with the first authentication request.

3. The computing platform of claim 1, wherein generating the one or more authentication prompts associated with the first authentication request comprises sending at least one authentication prompt to the account portal computing platform.

4. The computing platform of claim 1, wherein generating the one or more authentication prompts associated with the first authentication request comprises sending at least one authentication prompt to at least one user device registered to the first user account.

5. The computing platform of claim 1, wherein evaluating the first event pattern associated with the first authentication request comprises determining that the first event pattern associated with the first authentication request is a closer match to a predetermined valid event pattern than a predetermined malicious event pattern.

6. The computing platform of claim 5, wherein the predetermined valid event pattern is generated by the computing platform based on at least one previous successful login occurrence associated with the first user account.

7. The computing platform of claim 6, wherein the predetermined valid event pattern comprises valid order data, valid timing data, and valid device data associated with the at least one previous successful login occurrence associated with the first user account.

8. The computing platform of claim 6, wherein the predetermined valid event pattern is generated by the computing platform based on the valid population-level authentication data.

9. The computing platform of claim 8, wherein the predetermined malicious event pattern is generated by the computing platform based on malicious population-level authentication data.

10. The computing platform of claim 1, wherein the non-transitory memory stores additional computer-readable instructions that, when executed by the at least one hardware processor, cause the computing platform to:

prior to receiving the first authentication request from the account portal computing platform:

create a first user account profile corresponding to the first user account; and register one or more user devices as being linked to the first user account.

11. The computing platform of claim 10, wherein the non-transitory memory stores additional computer-readable instructions that, when executed by the at least one hardware processor, cause the computing platform to:

prior to receiving the first authentication request from the account portal computing platform:

update the first user account profile to include a valid event pattern based on a successful login occurrence associated with the first user account.

12. The computing platform of claim 11, wherein the non-transitory memory stores additional computer-readable instructions that, when executed by the at least one hardware processor, cause the computing platform to:

prior to receiving the first authentication request from the account portal computing platform:

update the valid population-level authentication data maintained by the computing platform based on the successful login occurrence associated with the first user account.

13. The computing platform of claim 1, wherein the non-transitory memory stores additional computer-readable instructions that, when executed by the at least one hardware processor, cause the computing platform to:

capture activity data associated with the first client portal session; and evaluate the captured activity data using baseline activity data.

14. The computing platform of claim 13, wherein the non-transitory memory stores additional computer-readable instructions that, when executed by the at least one hardware processor, cause the computing platform to:

based on evaluating the captured activity data using the baseline activity data, continue to allow access to the one or more secured information resources associated with the first user account in the first client portal session.

15. The computing platform of claim 13, wherein the non-transitory memory stores additional computer-readable instructions that, when executed by the at least one hardware processor, cause the computing platform to:

based on evaluating the captured activity data using the baseline activity data, halt access to the one or more secured information resources associated with the first user account in the first client portal session.

16. The computing platform of claim 1, wherein the non-transitory memory stores additional computer-readable instructions that, when executed by the at least one hardware processor, cause the computing platform to:

receive, via the communication interface, from the account portal computing platform, a second authentication request corresponding to a request for a second user of a second client computing device to access one or more secured information resources associated with a second user account in a second client portal session;

based on receiving the second authentication request from the account portal computing platform, capture one or more behavioral parameters associated with the second client computing device;

generate one or more authentication prompts associated with the second authentication request;

receive one or more authentication prompt responses corresponding to the one or more authentication prompts associated with the second authentication request;

evaluate a second event pattern associated with the second authentication request;

based on evaluating the second event pattern associated with the second authentication request and validating the one or more authentication prompt responses corresponding to the one or more authentication prompts associated with the second authentication request, generate one or more authentication commands directing the account portal computing platform to allow access to the one or more secured information resources associated with the second user account in the second client portal session; and send, via the communication interface, to the account portal computing platform, the one or more authentication commands directing the account portal computing platform to allow access to the one or more secured information resources associated with the second user account in the second client portal session.

17. A method, comprising:

at a computing platform comprising at least one hardware processor, a communication interface, and non-transitory memory:

receiving, by the at least one hardware processor, via the communication interface, from an account portal computing platform, a first authentication request corresponding to a request for a first user of a first client computing device to access one or more secured information resources associated with a first user account in a first client portal session;

based on receiving the first authentication request from the account portal computing platform, capturing, by the at least one hardware processor, one or more behavioral parameters associated with the first client computing device;

generating, by the at least one hardware processor, one or more authentication prompts associated with the first authentication request;

receiving, by the at least one hardware processor, one or more authentication prompt responses corresponding to the one or more authentication prompts associated with the first authentication request;

evaluating, by the at least one hardware processor, a first event pattern associated with the first authentication request;

based on evaluating the first event pattern associated with the first authentication request and validating the one or more authentication prompt responses corresponding to the one or more authentication prompts associated with the first authentication request, generating, by the at least one hardware processor, one or more authentication commands directing the account portal computing platform to allow access to the one or more secured information resources associated with the first user account in the first client portal session;

sending, by the at least one hardware processor, via the communication interface, to the account portal computing platform, the one or more authentication commands directing the account portal computing platform to allow access to the one or more secured information resources associated with the first user account in the first client portal session;

updating, by the at least one hardware processor, a valid event pattern associated with the first user account upon sending the one or more authentication commands to the account portal computing platform; and updating, by the at least one hardware processor, valid population-level authentication data maintained by the computing platform upon sending the one or more authentication commands to the account portal computing platform.

18. One or more non-transitory computer-readable media storing instructions that, when executed by a computing platform comprising at least one hardware processor, a communication interface, and non-transitory memory, cause the computing platform to:

receive, via the communication interface, from an account portal computing platform, a first authentication request corresponding to a request for a first user of a first client computing device to access one or more secured information resources associated with a first user account in a first client portal session;

based on receiving the first authentication request from the account portal computing platform, capture one or more behavioral parameters associated with the first client computing device;

generate one or more authentication prompts associated with the first authentication request;

receive one or more authentication prompt responses corresponding to the one or more authentication prompts associated with the first authentication request;

evaluate a first event pattern associated with the first authentication request;

based on evaluating the first event pattern associated with the first authentication request and validating the one or more authentication prompt responses corresponding to the one or more authentication prompts associated with the first authentication request, generate one or more authentication commands directing the account portal computing platform to allow access to the one or more secured information resources associated with the first user account in the first client portal session;

send, via the communication interface, to the account portal computing platform, the one or more authentication commands directing the account portal computing platform to allow access to the one or more secured information resources associated with the first user account in the first client portal session;

update a valid event pattern associated with the first user account upon sending the one or more authentication commands to the account portal computing platform; and update valid population-level authentication data maintained by the computing platform upon sending the one or more authentication commands to the account portal computing platform.

* * * * *